Feb. 28, 1928.
S. B. WINN
1,660,948
TRACTOR TRAILER COMBINATION
Filed March 29, 1926　　2 Sheets-Sheet 1
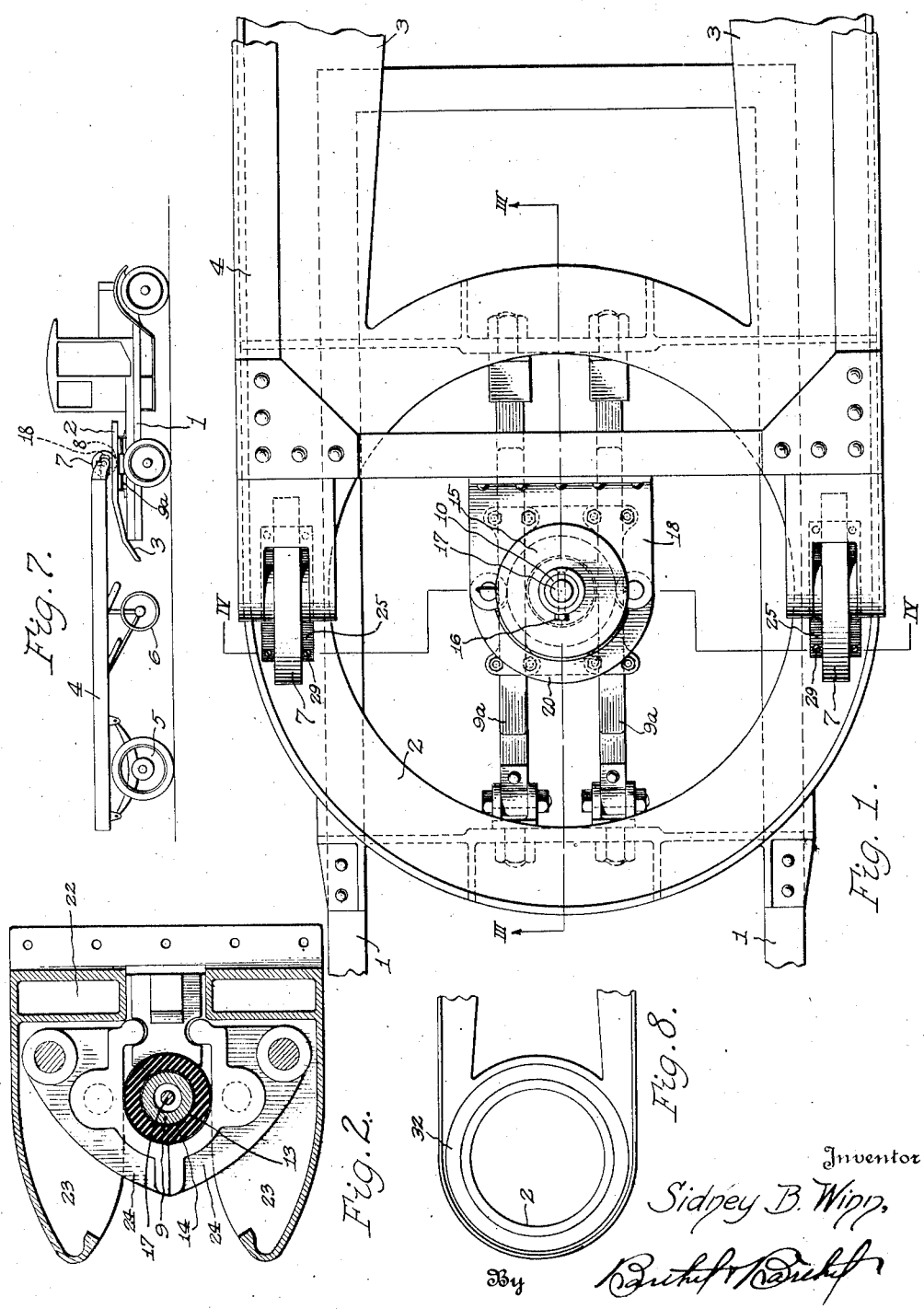

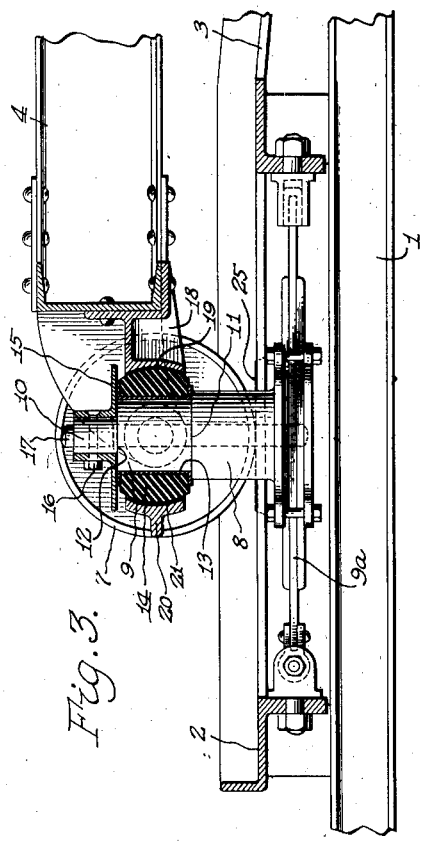
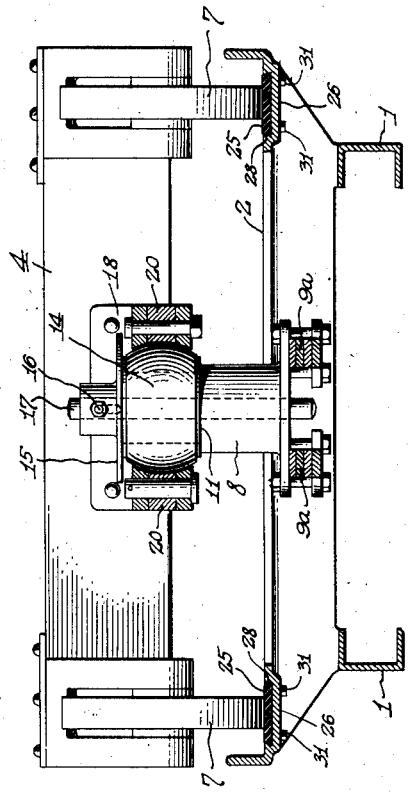
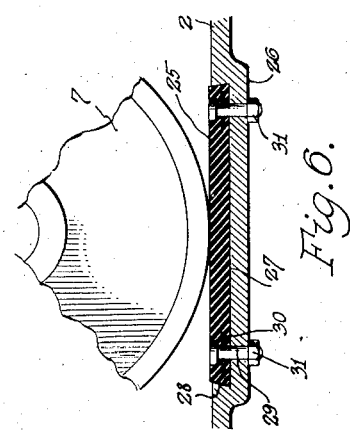
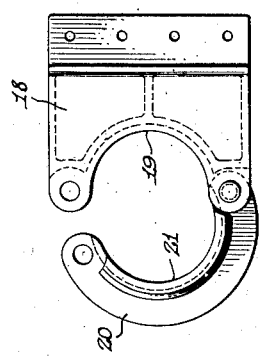

Patented Feb. 28, 1928.

1,660,948

UNITED STATES PATENT OFFICE.

SIDNEY B. WINN, OF LAPEER, MICHIGAN.

TRACTOR TRAILER COMBINATION.

Application filed March 29, 1926. Serial No. 98,146.

This invention relates to tractor trailer combinations wherein the forward end of a trailer rests on the rear end of a tractor and is coupled thereto with the coupled relation of the tractor and trailer including metal-to-metal contact, which, during the operation of the tractor trailer combination, causes noise. This is not desirable particularly in a train formation of passenger vehicles or where the forward end of a bus body is operatively coupled to a tractor. In a tractor trailer combination the connection between the tractor and trailer is ordinarily a coupler having metallic engaging and disengaging parts, and the forward end or bearing wheels of the trailer are adapted to rest on a platform or supporting members carried by the tractor. In both instances there is a metal-to-metal contact liable to produce a noise and to entirely eliminate such noise or at least deaden the same is the main object of this invention.

In the coupler of the vehicles I embody a resilient or yieldable member, and in a tractor trailer combination, the resilient member is preferably carried by the tractor coupling part. The tractor is also equipped with the resilient members for supporting the forward end of the trailer, and these resilient members constitute anti-noise means for coupled vehicles which will be hereinafter described and then claimed.

Reference will now be had to the drawings, wherein

Figure 1 is a plan of a portion of a tractor trailer combination showing the forward end of a trailer chassis, supported and coupled to the rear end of a tractor;

Fig. 2 is a horizontal sectional view of one form of tractor trailer coupler embodying a feature of this invention;

Fig. 3 is a vertical longitudinal sectional view taken on the line III—III of Fig. 1;

Fig. 4 is a cross sectional view taken on the line IV—IV of Fig. 1;

Fig. 5 is a plan of the trailer coupler member;

Fig. 6 is an enlarged longitudinal sectional view of a tractor pad for a trailer supporting bearing, wheel, roller or the like, Fig. 7 is a side elevation, somewhat diagrammatic, of a tractor trailer combination that may embody features of this invention, and Fig. 8 is a plan of a tractor platform provided with a circular pad.

Considering Fig. 7, for an example of two coupled vehicles, there is a tractor or towing vehicle 1 having its rear end provided with a platform 2 and inclined rails 3 leading to said platform. The trailer or towed vehicle includes a chassis 4 having a rear truck 5, an adjustable supporting leg 6, and wheels 7 at the forward end of the chassis 4 adapted to ascend the inclined rails 3 and rest on the platform 2 of the tractor 1.

There are various kinds of couplers for connecting the forward end of the trailer to the rear end of the tractor and considering Figures 3 and 4 the tractor coupler member includes an upstanding hollow pin or member 8 yieldably supported by tractor springs $9^a$ so that said coupler member may yield in a vertical direction and also have an oscillatory movement relative to the tractor platform 2. The upper end of the coupler member 8 is stepped or provided with two reduced portions 9 and 10, both affording horizontally supporting shoulders 11 and 12 respectively. On the shoulder 11 and surrounding the reduced portion 9 is a resilient member, preferably in the form of a metallic spool or sleeve 13 supporting a circular or substantially cylindrical buffer or cushion 14. This buffer or cushion is preferably made of rubber and is formed with a convex face. Being carried by the spool 13 it can be readily removed from the coupler member 8.

On the shoulder 12 and surrounding the reduced portion 10 of the coupler member 8 is a retaining cap or collar 15 which engages the upper end of the spool 13 and prevents accidental displacement of the resilient member. The cap or collar 15 is held in place by a transverse member 16 mounted in the reduced portion 10 of the coupler member 8 and when this coupler member forms part of a tractor trailer combination wherein trailer brakes are controlled from the tractor, as disclosed in my Patent No. 1,548,967 dated August 11, 1925, then the coupler member includes a slidable brake pin 17. The cap or collar 15 also prevents vertical displacement of a trailer coupler member on the coupler member 8, and two forms of trailer coupler member will now be described.

The trailer coupler member may include a coupler head 18 having a concave seat 19 and a single pivoted knuckle 20 adapted to cooperate with the coupler head in engaging the resilient member on the tractor coupler member 8. The knuckle or gate 20 may have a concave seat 21 to cooperate with the seat 19 in providing an inclosure for the buffer 14, as best shown in Fig. 3, where it will be noted that metallic parts of the trailer coupler member cannot contact with metallic parts of the tractor coupler member, thus eliminating any noise incident to metal-to-metal contact of parts.

Another form of trailer coupler head is shown in Fig. 2 where the head is designated 22 and has hollow jaws 23 provided with pivoted knuckles 24 adapted to cooperate with the coupler head 22 in embracing the buffer 14. This coupler head is illustrated and briefly described to identify the buffer 14 with the coupler of the tractor trailer combination disclosed in my pending application, Serial No. 94,405, filed March 13, 1926.

The wheels 7 at the forward end of the trailer chassis 4 ordinarily rest direct upon the metallic platform 2 and to eliminate or materially reduced any noise incident to movement of the wheels 7 on the platform 2, I provide yieldable pads or resilient members 25. These pads or members, as best shown in Figs. 1, 4 and 6 are countersunk in the platform 2 by providing the platform, at diametrically opposed points, with depressed portions 26 affording recesses 27 having inclined side walls 28 which will afford somewhat of a dove-tail connection for a pad or resilient member in a recess.

The pads or resilient members 25 are of a sufficient length to permit of the wheels 7 rolling thereon, under normal operating conditions of the tractor trailer combination without contacting with the platform 2, except when the tractor turns relative to the trailer. Such turning is of short duration and the wheels 7 are again on the pads or resilient members so that any jarring or vibration of the coupled vehicles cannot cause any noise incident to the wheels 7 being supported by the platform 2. However, I may provide a circular pad 32, as shown in Fig. 8, so that there will be a complete cushion or yieldable path of travel for the trailer wheels 7 when turning on the tractor.

The pads or resilient members 25 may be anchored or attached to the platform 2 by various devices, an example being shown in Fig. 6, where bolts 29 have the heads thereof countersunk in the pad 25 with the shank of each bolt braced by an embedded washer 30, and each bolt held in the depressed portion 26 of the platform by a nut 31. The pad or resilient member may be easily removed, particularly when worn and a new pad placed in position, so that the pads at all times may cooperate with the coupler buffer in preventing any unnecessary noise incident to a coupled relation of the tractor and trailer.

What I claim is:

1. In a train formation wherein vehicles are coupled together, a coupler adapted to provide draft action between and to permit dirigible movements of the coupled vehicles, said coupler including metallic parts adapted for engagement and disengagement, and a resilient member interposed between said metallic parts and supported by one of said metallic parts, said member providing cushioning characteristics in the draft action throughout the range of dirigible movement.

2. A coupler for vehicles, as called for in claim 1, wherein one of said metallic parts is a yieldably supported upstanding member on which said resilient member is mounted and adapted to be surrounded in part by the other metallic part.

3. As an article of manufacture, an anti-noise device for a coupler including a member adapted to be engaged by another member, for draft and dirigible purposes, said device comprising a spool adapted to fit on the first mentioned member, and a buffer on said spool and engageable by the last mentioned member, said buffer being active in the draft action throughout the range of dirigible movement.

4. In a tractor-trailer combination, wherein the tractor and trailer are coupled together for combined serve conditions with the forward end of the trailer supported by the tractor, and wherein the coupler is inactive in the support of the load weight of the trailer, a coupling instrumentality including a metallic element adapted to be gripped by a second metallic element for pivotal movement about a vertical axis with one element carried by the tractor and the other by the trailer and with the elements active in the draft and dirigible activities of the combination, and cushioning means carried by the gripped element to form the gripped surface of such element, said means being positioned and having a formation such as to present a non-metallic contact with the gripping element.

5. A combination as in claim 4 characterized in that the means is in the form of an annular non-metallic member having a non-resilient and rigid internal facing adapted to be mounted on the gripped element, whereby the facing and element will permit the non-metallic annular member to be gripped by and move with the gripping element during dirigible movements of the combination.

6. A combination as in claim 4 characterized in that the gripped element is carried by the tractor and the gripping element includes a gripping jaw assembly movable to permit coupling and uncoupling of tractor and trailer by relative movements of tractor and trailer in the direction of traction to permit combined or independent service of the tractor and trailer.

7. A combination as in claim 4 characterized in that the tractor and trailer have co-operating structures such as to provide contact between tractor and trailer for trailer support purposes spaced from the coupling zone to produce characteristics of an annular fifth-wheel formation, the tractor-carried portion of the formation including a non-metallic facing active as the contacting surface to support the trailer-carried portion of the fifth-wheel formation within predetermined ranges of fifth-wheel action when tractor and trailer are coupled for combined service.

8. In a tractor-trailer combination, wherein the tractor and trailer are coupled together for combined service conditions with the forward end of the trailer supported by the tractor, and wherein the coupler is inactive in the support of the load weight of the trailer, a coupling instrumentality located within a zone having as its axis the axis of dirigible movement of trailer relative to the tractor, said tractor and trailer having co-operating metallic structures such as to provide contact between tractor and trailer for trailer support purposes with the structures positioned outside of and spaced from the coupling instrumentality zone, the co-operating structures being such as to provide characteristics of an annular fifth-wheel formation, one of the structures of the formation having a non-metallic facing outside of the instrumentality zone and active as a contact surface in the support of the trailer within predetermined ranges of fifth-wheel action when the tractor and trailer are coupled for combined service, whereby supporting contact between tractor and trailer will be limited to a metal to non-metal characteristic within such ranges of dirigible movement.

9. A combination as in claim 8, characterized in that the facing is carried by the tractor-carried portion of the formation and extends on opposite sides of the coupling instrumentality zone.

10. In a tractor-trailer combination, wherein the tractor and trailer are coupled together for combined service conditions with the forward end of the trailer supported by the tractor, and wherein the coupler is inactive in the support of the load weight of the trailer, a coupling instrumentality located within a zone having as its axis the axis of dirigible movement of trailer relative to the tractor, said tractor and trailer having co-operating metallic structures such as to provide contact between tractor and trailer for trailer support purposes with the structures positioned outside of and spaced from the coupling instrumentality zone, the co-operating structures being such as to provide characteristics of an annular fifth-wheel formation, one of the structures of the formation having a non-metallic facing outside of the instrumentality zone and active as a contact surface in the support of the trailer during fifth-wheel action when the tractor and trailer are coupled for combined service, whereby supporting contact between tractor and trailer will be limited to a metal to non-metal characteristic.

In testimony whereof I affix my signature.

SIDNEY B. WINN.